Sept. 21, 1943.   K. L. HANSEN   2,329,759
COMMUTATION MEANS
Filed March 23, 1942
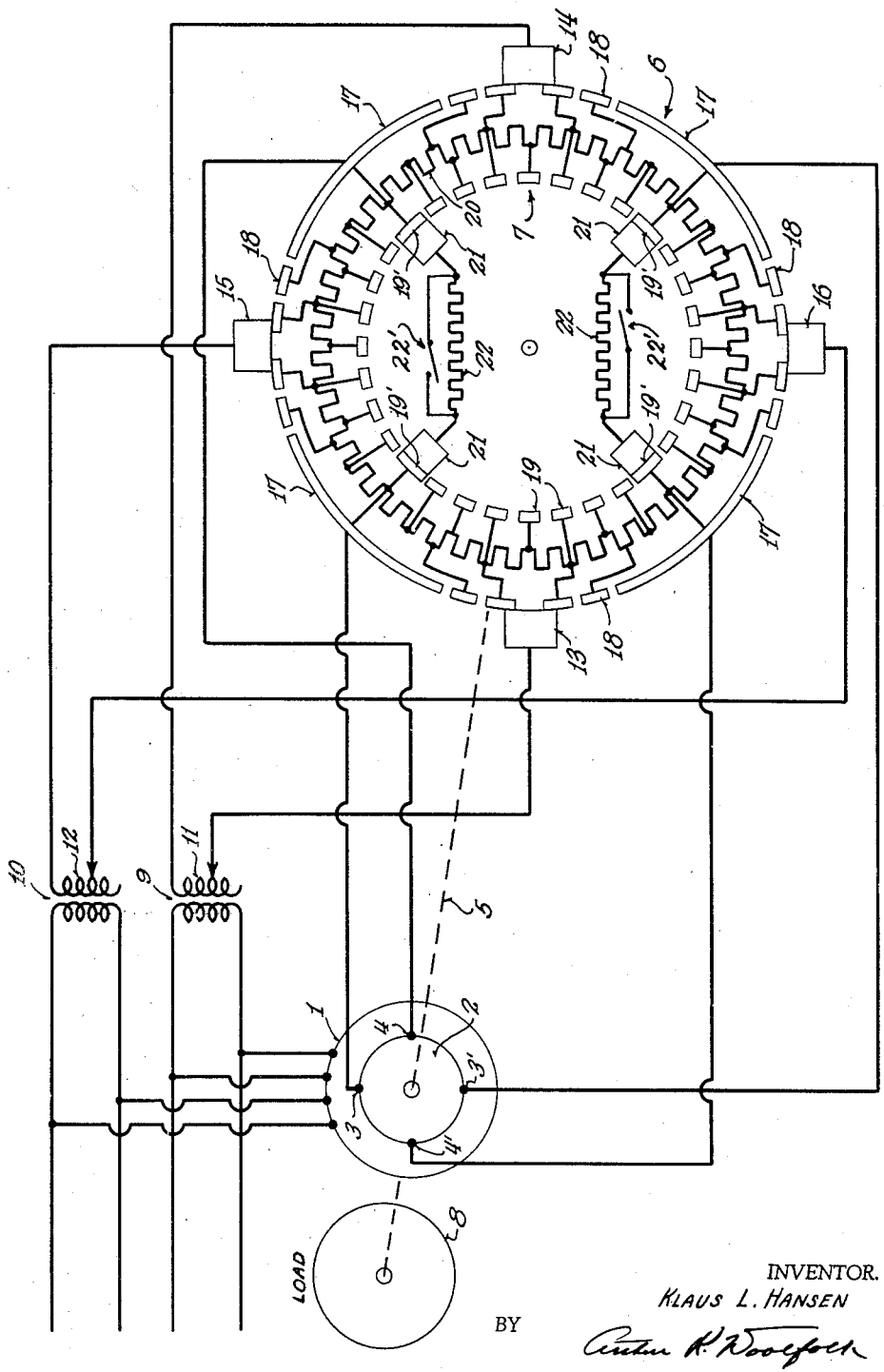
INVENTOR.
KLAUS L. HANSEN
BY
ATTORNEY Patented Sept. 21, 1943

2,329,759

UNITED STATES PATENT OFFICE 2,329,759

COMMUTATION MEANS

Klaus L. Hansen, Milwaukee, Wis.

Application March 23, 1942, Serial No. 435,795

12 Claims. (Cl. 172—280)

This invention relates to commutation means and is particularly directed to commutation means when used in connection with an alternating current motor.

Objects of this invention are to provide a novel form of commutating means associated with an alternating current motor in a novel manner so that the arrangement provides speed control, power factor correction and frequency conversion, and to provide for good commutation with a minimum of sparking under all conditions.

In greater detail, objects of this invention are to provide main commutating means and to provide a parallel path or parallel paths through auxiliary commutating means whose resistance periodically and automatically fluctuates from maximum to minimum, the minimum value occurring during commutation and the maximum value occurring between periods of commutation at the main commutator, thereby securing all of the advantages of bridging resistances between segments of the main commutator while avoiding loss of efficiency.

This invention has for further objects the provision of means for preventing excessive heating of the main or auxiliary brushes and low starting torque due to large armature reaction when the motor is started under load no matter what may be the relative position of the commutating means and brushes at the time of starting, the invention, instead, providing high starting torque and freedom from undesirable heating at the brushes even when starting under load.

Before discussing the illustrated embodiment of this invention, a brief outline is given of the theories involved.

Assume, in an induction motor, that the rotor winding and leads are symmetrical with reference to the primary, and that the ratio of transformation is 1 to 1. At standstill, with the secondary open-circuited, the induced voltage is approximately equal and opposite to the impressed voltage. If, then, the secondary leads are connected to the line terminals so as to impress on the secondary voltage equal and bucking the induced voltage, the only current that would flow in the secondary is a part of the primary exciting current and no torque would be developed. The free running speed of the motor has therefore in that case been reduced to zero. On the other hand, assume that an impressed voltage boosting the secondary induced voltage is impressed on the rotor circuits. There is then obviously no tendency to reduce the torque to zero at any speed below synchronism. Although the induced voltage is zero at synchronism, there is a torque because the inserted voltage maintains a torque-producing current and the rotor continues to accelerate. As the rotor speeds up above synchronism, the secondary induced voltage increases in magnitude and has changed sign, and is therefore in opposition to the impressed voltage. Manifestly, the motor will speed up until the induced and inserted voltages are of approximate equality and the secondary current and torque reduced to zero. Because of the fact that the secondary induced E. M. F. changes its phase angle through 180° above synchronism, it must be understood that when speaking of the inserted E. M. F. as boosting or bucking the induced E. M. F., it is the phase relations below synchronism that are referred to.

It is obvious also that if the impressed voltage is bucking the induced voltage, that the effective voltage inducing torque-producing current is reduced and consequently the speed of the motor is reduced.

A full discussion of these theories is given in a paper by the inventor herein named published in the Journal of the American Institute of Electrical Engineers of December, 1923, page 1321, entitled "Modification of polyphase induction motor performance by introduction of E. M. F. in secondary."

An embodiment of the invention is shown in the accompanying drawing, in which:

The figure is a view showing the invention as applied to speed control, power factor correction, and frequency conversion.

Referring to the drawing, it will be seen that a two-phase alternating current motor has been shown in which the two phases of the stator 1 are connected to the two-phase mains. The motor is provided with a wound rotor 2 which is provided with a two-phase winding, the terminals of the respective phases being indicated at 3, 3' and 4, 4'. The rotor is connected by means of the shaft 5 with the commutating means which consists of a main commutator indicated generally by the reference character 6 and an auxiliary commutator indicated generally by the reference character 7. The motor is also directly connected in any suitable manner with a mechanical load 8.

Transformers indicated at 9 and 10 are supplied from the two-phase mains and are provided with tapped secondaries 11 and 12 respectively.

The secondary 11 is connected to main brushes 13 and 14 and the secondary 12 is connected to the main brushes 15 and 16. All of the main brushes bear on the main commutator.

The main commutator is provided with a plurality of main segments of considerable extent and indicated by the reference character 17, and the main commutator is also provided with a plurality of auxiliary segments 18 located between the adjacent main segments.

The auxiliary commutator is provided with a plurality of segments 19 certain of which may be slightly larger than others as indicated by the reference character 19', though this is not absolutely essential. The segments 19 and 19' of the auxiliary commutator are connected at regular spaced points to a continuous resistor 20 and the segments 19', which are spaced at uniform points around the auxiliary commutator, are connected to the main segments 17 of the main commutator. The auxiliary segments 18 of the main commutator are connected to the resistor 20 as indicated. If desired, independent resistors could be connected between the auxiliary segments 18 of the main commutator and the main segments 17 of the main commutator as identically the same results would be accomplished.

A plurality of regularly spaced auxiliary brushes 21 bear on the auxiliary commutator and are connected in pairs by means of the resistors 22. If desired, a switch may be provided for each of the resistors 22 to short-circuit the resistors when the device comes up to speed. This switch may be operated either manually or automatically as indicated by the reference character 22'. It is to be noted that the main segments 17 of the main commutator are connected to the two-phase winding of the rotor 2 of the alternating current motor at the points 3, 3' and 4, 4' as indicated.

It is to be understood that the main brushes and the auxiliary brushes are shiftable simultaneously as a unit to any desired position, as will be explained hereinafter, and it is also to be understood that the voltage impressed on the main brushes from the secondaries 11 and 12 may be varied by shifting the tap point as required and as will be explained hereinafter.

The arrangement provides for both power factor correction and speed variation, depending on the brush position and the voltage impressed on the wound secondary or rotor 2 of the motor from the secondaries 11 and 12 of the transformers. For power factor correction the brushes would be set electrically at right angles to their neutral position to produce a magnetizing component and the amount of voltage supplied would determine the amount of power factor correction. The amount of voltage supplied would be obtained by adjusting the taps on the secondaries 11 and 12 of the transformers.

For speed variation the brushes would be set to produce an energy component in phase with the induced voltage in the rotor windings either assisting or opposing, depending upon whether speed increase or decrease for the rotor of the variable speed two-phase motor was desired. Thereafter by varying the voltage of the secondaries 11 and 12 of the transformers, the variation in the speed of rotation to the desired point could be obtained. Of course, in intermediate positions of the brushes it is possible to produce both a variation in power factor and in speed.

It is to be noted particularly that this invention avoids excessive heating of the brushes although the motor starts under load. The arrangement is such that when commutation is taking place at the main commutator, the relative motion between the main commutator and the main brushes causes the main brushes to travel over the auxiliary segments 18 of the main commutator and resistance in graduated steps is interposed and thus sparking at the main brushes is avoided. Also it is to be noted that at the instant the auxiliary brushes connect two main segments 17 of the main commutator, excessive current flow cannot occur as the resistors 22 are interposed in this circuit, and that excessive heating of the auxiliary brushes will not occur. Also there is a minimum of sparking both at the main and auxiliary brushes for the circuit is altered by gradually interposing the successive steps of the resistor 20 as the commutator structure revolves.

This arrangement also insures a high starting torque for the motor and avoids excessive induced current in the wound rotor which would produce adverse armature reaction tending to lower the starting torque.

Although a two-phase motor has been illustrated, it is within the province of this invention to employ a three-phase or any other polyphase motor if so desired. Also it is to be understood that although the winding of the rotor has been described as two-phase, such rotor could be wound for any desired number of phases, the main and auxiliary commutator and their brushes being correspondingly altered.

It is to be noted that the main segments 17 of the main commutator are much larger than the auxiliary segments 18 of the main commutator, and that the main brushes are, therefore, in contact with the main segments for a very large proportion of the time of one revolution. In this manner, the main brushes, and consequently the secondaries of the transformers 9 and 10, are directly connected to the windings of the rotor 2 of the motor and no resistance is interposed in such circuit for such greater part of the time of one revolution.

It is to be understood that although the main segments of the main commutator are shown connected to the rotor and the source of alternating current connected to the stator, such connection could be reversed and the rotor could be supplied from the alternating current source and the stator connected to the main segments of the main commutator, suitable slip rings being provided.

It is intended that the main and auxiliary commutators and the resistor 20 shall be constructed as a unitary member.

It will be seen that this invention provides for power factor correction or speed control or both and for frequency conversion, and under all conditions minimizes sparking at the main and auxiliary commutators.

Although this invention has been described in considerable detail, it is to be understood that such description is intended as illustrative rather than limiting, as the invention may be variously embodied and is to be interpreted as claimed.

I claim:

1. A device for commutating alternating current comprising a main and an auxiliary commutator, main and auxiliary brushes bearing on said main and auxiliary commutator respectively, means connecting said auxiliary brushes, means for causing relative rotation between said commutators and their respective brushes, said main commutator having a plurality of main segments and having auxiliary segments located between said main segments, a resistor connected to the main and auxiliary segments of said main commutator, said auxiliary commutator having a plurality of segments connected at spaced points to said resistor, and means for leading current to the main segments of said main commutator.

2. A device for commutating alternating current comprising a main and auxiliary commutator, main and auxiliary brushes bearing on said main and auxiliary commutator respectively, means connecting said auxiliary brushes, means for causing relative rotation between said commutators and their respective brushes, said main commutator having a plurality of main segments and having auxiliary segments located between said main segments, a resistor connected to the main and auxiliary segments of said main commutator, said auxiliary commutator having a plurality of segments, certain of the segments of said auxiliary commutator being connected to said resistor and to the main segments of said main commutator and other of the segments of said auxiliary commutator being connected to said resistor, and means for leading current to the main segments of said main commutator.

3. A device for commutating alternating current comprising a main and an auxiliary commutator, main and auxiliary brushes bearing on said main and auxiliary commutators respectively, bridge circuits provided with resistors connecting said auxiliary brushes, means for causing relative rotation between said commutators and their respective brushes, said main commutator having a plurality of main segments and auxiliary segments located between said main segments, a main resistor connected to the main and auxiliary segments of said main commutator, said auxiliary commutator having a plurality of segments connected at spaced points to said main resistor, and means for leading alternating current to the main segments of said main commutator.

4. A device for commutating alternating current comprising a main and an auxiliary commutator, main and auxiliary brushes bearing on said main and auxiliary commutators respectively, bridge circuits provided with resistors connecting said auxiliary brushes, means for causing relative rotation between said commutators and their respective brushes, said main commutator having a plurality of main segments and auxiliary segments located between said main segments, a main resistor connected to the main and auxiliary segments of said main commutator, said auxiliary commutator having a plurality of segments, certain of the segments of said auxiliary commutator being connected to the main segments of said main commutator and to widely spaced points of said main resistor and other of the segments of said auxiliary commutator being connected to relatively closely spaced points of said main resistor, and means for leading alternating current to the main segments of said main commutator.

5. In a device of the class described, the combination of a source of polyphase alternating current, a polyphase motor having two units consisting of a wound stator and a wound rotor, a main commutator and an auxiliary commutator driven from said polyphase motor, said main commutator having a plurality of segments electrically connected to the windings of one of the units of said polyphase motor, the other unit of said polyphase motor being connected to the source of polyphase alternating current, said auxiliary commutator having a plurality of segments, regularly spaced segments of said auxiliary commutator being connected to the segments of said main commutator, a resistor having spaced points connected to the segments of said auxiliary commutator, a plurality of auxiliary brushes bearing upon said auxiliary commutator and connected by resistors, and a plurality of main brushes bearing on said main commutator and supplied with alternating current from said source of polyphase alternating current.

6. In a device of the class described, the combination of a source of polyphase alternating current, a polyphase motor having two units consisting of a wound stator and a wound rotor, a main commutator and an auxiliary commutator driven from said polyphase motor, said main commutator having a plurality of main segments electrically connected to the windings of one of the units of said polyphase motor, the other unit of said polyphase motor being connected to the source of polyphase alternating current, said auxiliary commutator having a plurality of segments, regularly spaced segments of said auxiliary commutator being connected to the segments of said main commutator, a resistor having spaced points connected to the segments of said auxiliary commutator, said main commutator having a plurality of auxiliary segments located between said main segments and connected to said resistor at spaced points, a plurality of auxiliary brushes bearing upon said auxiliary commutator and joined by resistors, and a plurality of main brushes bearing on said main commutator and supplied with alternating current from said source of polyphase alternating current.

7. In a power factor and speed control device of the class described, the combination of a source of polyphase alternating current, a polyphase motor having two units consisting of a wound stator and a wound rotor, a main commutator and an auxiliary commutator driven from said polyphase motor, said main commutator having a plurality of segments electrically connected to the windings of one of the units of said polyphase motor, the other unit of said polyphase motor being connected to the source of polyphase alternating current, said auxiliary commutator having a plurality of segments, regularly spaced segments of said auxiliary commutator being connected to the segments of said main commutator, a resistor having spaced points connected to the segments of said auxiliary commutator, a plurality of auxiliary brushes bearing upon said auxiliary commutator and connected by resistors, and a plurality of main brushes bearing on said main commutator and supplied with alternating current from said source of polyphase alternating current, said main and auxiliary brushes being shiftable.

8. In a power factor and speed control device of the class described, the combination of a source of polyphase alternating current, a polyphase motor having two units consisting of a wound stator and a wound rotor, a main commutator and an auxiliary commutator driven from said polyphase motor, said main commutator having a plurality of main segments electrically connected to the windings of one of the units of said polyphase motor, the other unit of said polyphase motor being connected to the source of polyphase alternating current, said auxiliary commutator having a plurality of segments, regularly spaced segments of said auxiliary commutator being connected to the segments of said main commutator, a resistor having spaced points connected to the segments of said auxiliary commutator, said main commutator having a plurality of auxiliary segments located between said main segments and connected to said resistor at spaced points, a plurality of auxiliary brushes bearing upon said auxiliary commutator and joined by resistors, and a plurality of main brushes bearing on said main commutator and supplied with alternating current from said source of polyphase alternating current, said main and auxiliary brushes being shiftable.

9. In a power factor and speed control device of the class described, the combination of a source of polyphase alternating current, a polyphase motor having two units consisting of a wound stator and a wound rotor, a main commutator and an auxiliary commutator driven from said polyphase motor, said main commutator having a plurality of main segments electrically connected to the windings of one of the units of said polyphase motor, the other unit of said polyphase motor being connected to the source of polyphase alternating current, said auxiliary commutator having a plurality of segments, regularly spaced segments of said auxiliary commutator being connected to the segments of said main commutator, a resistor having spaced points connected to the segments of said auxiliary commutator, said main commutator having a plurality of auxiliary segments located between said main segments and connected to said resistor at spaced points, a plurality of auxiliary brushes bearing upon said auxiliary commutator and joined by resistors, a plurality of main brushes bearing on said main commutator and supplied with alternating current from said source of polyphase alternating current, and means for varying the voltage impressed on said main brushes from said source of polyphase alternating current, said main and auxiliary brushes being shiftable.

10. In a device of the class described, the combination of a source of polyphase alternating current, a polyphase motor having two units consisting of a wound stator and a wound rotor, a main commutator and an auxiliary commutator driven from said polyphase motor, said main commutator having a plurality of main segments electrically connected to the windings of one of the units of said polyphase motor, the other unit of said polyphase motor being connected to the source of polyphase alternating current, said auxiliary commutator having a plurality of segments, regularly spaced segments of said auxiliary commutator being connected to the segments of said main commutator, a resistor having spaced points connected to the segments of said auxiliary commutator, said main commutator having a plurality of auxiliary segments located between said main segments and connected to said resistor at spaced points, the main segments of said main commutator being of much greater width than the auxiliary segments of said main commutator, a plurality of auxiliary brushes bearing upon said auxiliary commutator and joined by resistors, and a plurality of main brushes bearing on said main commutator and supplied with alternating current from said source of polyphase alternating current.

11. In a frequency conversion device, main commutator means including two sets of elements, one set of elements consisting of brushes and the other set of elements consisting of a plurality of segments, auxiliary commutator means consisting of two sets of elements, one of said sets of elements of said auxiliary commutator means consisting of a plurality of segments and the other of said sets of elements of said auxiliary commutator means consisting of a plurality of brushes, a closed resistor having spaced points connected to the segments of said auxiliary commutator means, the segments of said main commutator means comprising a plurality of main segments connected to spaced elements of said auxiliary commutator means, and a plurality of auxiliary segments located between the said main segments and connected to said resistor, bridging circuits including resistors connecting the brushes of said auxiliary commutator means, motor means for driving said main and auxiliary commutator means, said motor means having primary and secondary windings, means for supplying polyphase electric energy to one set of elements of said main commutator means, and means for supplying polyphase electric energy to the primary of said motor means, the secondary of said motor means receiving energy from the other set of elements of said main commutator means.

12. A device for commutating alternating current comprising a main and an auxiliary commutator, main and auxiliary brushes bearing on said main and auxiliary commutators respectively, bridge circuits provided with resistors connecting said auxiliary brushes, normally open switch means for short-circuiting said resistors, means for causing relative rotation between said commutators and their respective brushes, said main commutator having a plurality of main segments and auxiliary segments located between said main segments, a main resistor connected to the main and auxiliary segments of said main commutator, said auxiliary commutator having a plurality of segments, certain of the segments of said auxiliary commutator being connected to the main segments of said main commutator and to widely spaced points of said main resistor and other of the segments of said auxiliary commutator being connected to relatively closely spaced points of said main resistor; and means for leading alternating current to the main segments of said main commutator.

KLAUS L. HANSEN.